P. G. TACCHI.
INTERNAL COMBUSTION ENGINE.
APPLICATION FILED MAR. 3, 1913.

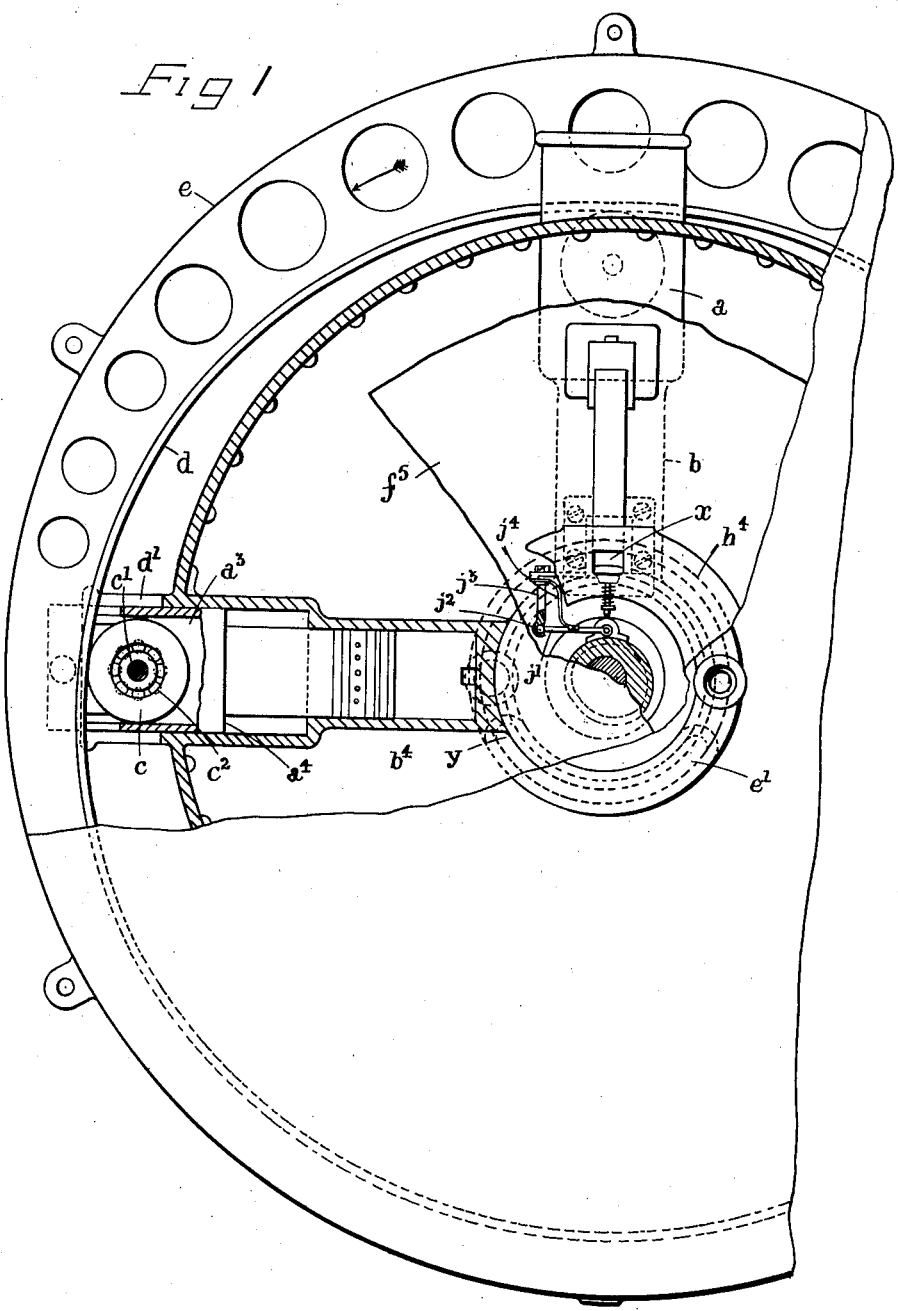

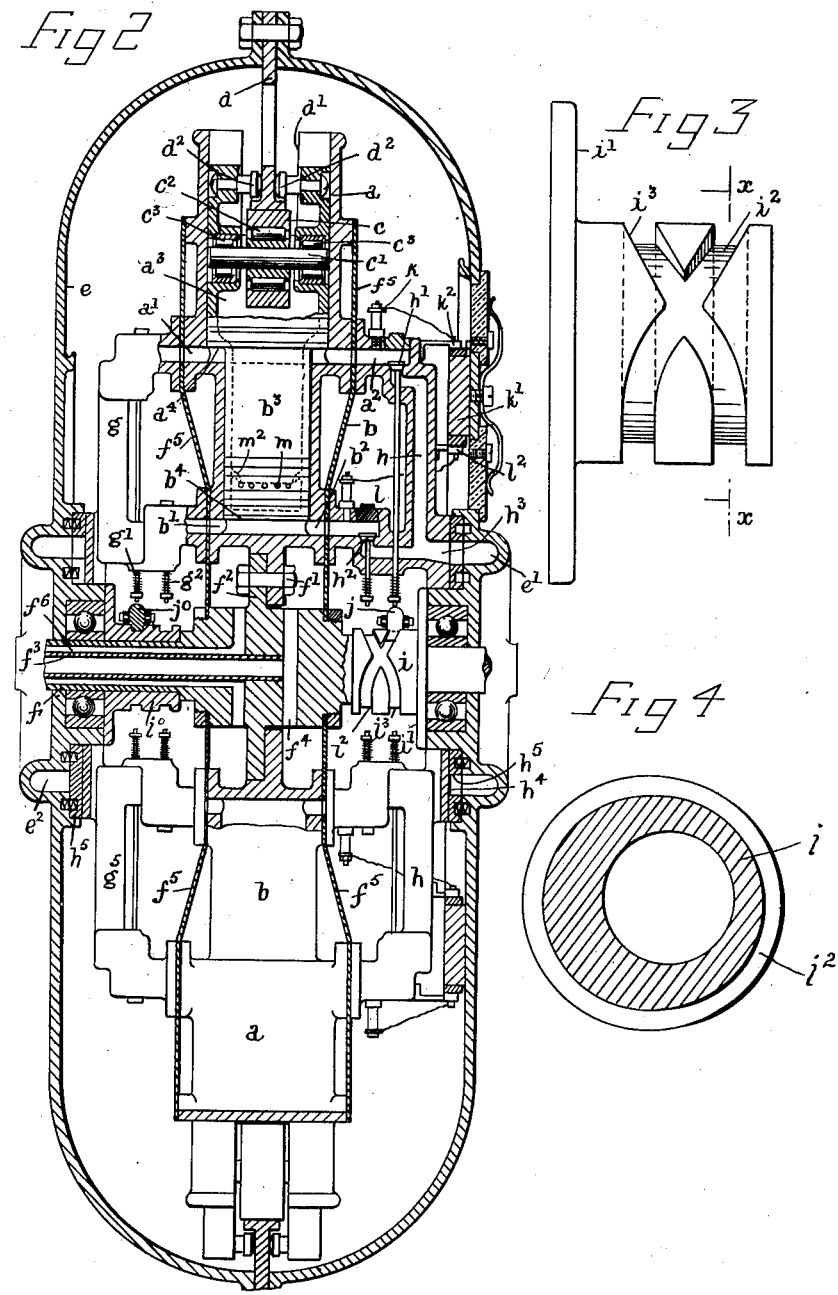

1,112,338.

Patented Sept. 29, 1914.
3 SHEETS—SHEET 3.

Witnesses

Inventor
Percy George Tacchi
his Attorneys

UNITED STATES PATENT OFFICE.

PERCY GEORGE TACCHI, OF ACTON, LONDON, ENGLAND.

INTERNAL-COMBUSTION ENGINE.

1,112,338.  Specification of Letters Patent.  Patented Sept. 29, 1914.

Application filed March 3, 1913. Serial No. 751,884.

*To all whom it may concern:*

Be it known that I, PERCY GEORGE TACCHI, residing at 29 Nemoure road, Acton, London, in the county of Middlesex, England, engineer, have invented a new and useful Improvement in or Relating to Internal-Combustion Engines, of which the following is a specification.

This invention relates to internal combustion engines having cylinders arranged radially with or tangentially to a central shaft to which they are attached and with which they revolve.

In the specification to my application No. 709,525 is described an engine of the above type, which is characterized by each piston being provided with a roller mounted on a gudgeon pin and bearing against the inner surface of a ring fixed in the plane of the cylinders but eccentric to the shaft with which they revolve, the stroke of each piston corresponding with the eccentricity of the said ring. The ring intersects the cylinders at the outer ends of the latter, and the pistons may also be slotted at their outer ends to receive the ring so that they are prevented from turning in their cylinders. This engine works on a two-stroke cycle, and the primary object of my present invention is to provide an engine of a similar type capable of working on a four-stroke cycle. With this object, I construct each piston with an enlarged base or outer end, the annular surface of which is equal in area to the top or inner end of the piston, and I cause the ignition of the combustible mixture to take place at the inner and the outer ends of the piston alternately. That is to say, during the expansion of the products of combustion in the inner end of the cylinder a charge of combustible mixture is being drawn into the outer end of the cylinder, this charge is then compressed during the return stroke while the waste gases from the previous charge in the inner end of the cylinder are being expelled, ignition of the charge in the outer end of the cylinder is now effected and during this working stroke of the piston a fresh charge is being drawn into the inner end of the cylinder, and, finally on the fourth stroke of the piston the fresh charge in the inner end of the cylinder is compressed while the waste gases are being expelled from the outer end of the cylinder.

An engine embodying my present invention is illustrated in the accompanying drawings, in which:—

Figure 5:
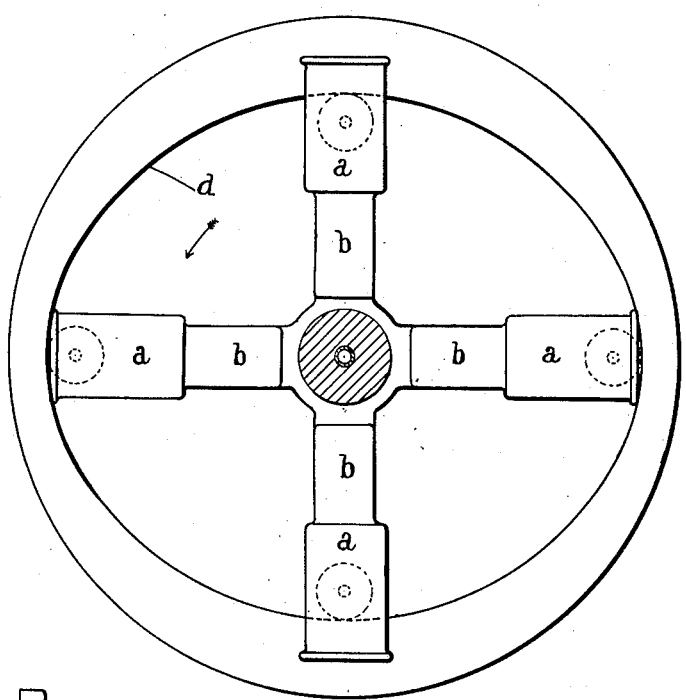
Figure 6:
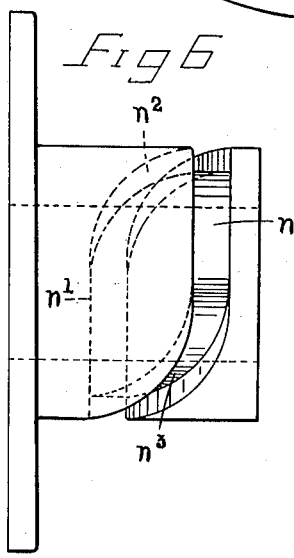
Figure 7:
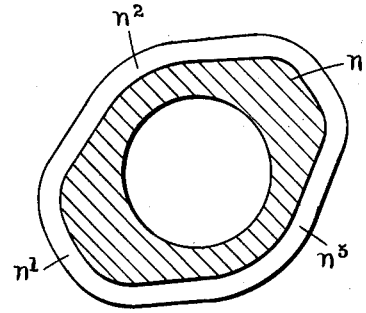

Figure 1 is a fragmentary side view of the engine partly in section and partly in elevation, and Fig. 2 a transverse section. Fig. 3 illustrates in side elevation and to an enlarged scale the cam for operating the inlet and the exhaust valves and Fig. 4 is a section on the line $x$—$x$ in Fig. 3 and shows the shape of the cam. Fig. 5 illustrates diagrammatically a modification hereinafter described. Fig. 6 is a side elevation of the cam employed with the modified construction, and Fig. 7 is a section through the cam groove and shows the shape of the cam.

In the construction illustrated the engine comprises four cylinders, but the number of cylinders may be increased if desired or decreased to three cylinders. Each cylinder, for a portion of its length corresponding to the stroke of the piston, is larger in diameter at its outer end $a$ than at its inner end $b$, and at the junction of these two diameters are oppositely disposed inlet and outlet openings $a'$, $a^2$, while at the extremity of the inner end $b$ are similar openings $b'$, $b^2$. Within the cylinder is a piston having an enlarged end $a^3$ corresponding to the larger diameter $a$ of the cylinder, and a smaller end $b^3$ corresponding to the smaller diameter $b$ of the cylinder. The annular face $a^4$ of the larger end of the piston should equal in area the face $b^4$ of the smaller end thereof, so that the forces acting at each end of the piston may be equal. The larger end $a^3$ of the piston is furnished with a roller $c$ which may be mounted upon a gudgeon pin $c'$ in the manner described in my aforesaid specification, but in order to minimize friction I prefer to support the roller $c$ upon roller bearings $c^2$ mounted upon the gudgeon pin $c'$, while the ends of the latter are supported in roller bearings $c^3$ mounted in the wall of the piston. The roller $c$ bears against the inner face of a ring $d$ which is fixed to the casing $e$ and is eccentric to the shaft $f$. In the present application the ring or track "$d$" is not shown merely as a true circle eccentrically disposed relatively to the shaft as in my aforesaid application, but as an alternative Fig. 1 shows a ring having its radius from the shaft $f$ gradually increasing through an angle of about 120°, then continuing this increased radius unaltered from 120° to 240° and for the remainder of the circle the radius is gradually reduced to meet the minimum radius at 360°. The gradual decrease in the radius of the ring may, however, commence from 120° if desired and be continued to 360°. The ring $d$ is in the plane of the cylinders, and the outer ends $a$ of the latter are slotted at $d'$ to clear the said ring; while the inner ends $b$ of the cylinders are attached by means of bolts $f'$ to a flange $f^2$ provided on the shaft $f$. To prevent turning of the pistons in their cylinders, the former are also slotted to receive the ring $d$. The outer ends of the pistons may, moreover, be provided with rollers or stops $d^2$ which normally are free from the ring $d$, but engage with the flange of the ring and move the pistons outward when the engine is revolved for starting.

The inlet openings $a'$, $b'$, in each cylinder for the admission of fuel are connected together by means of a conduit $g$, and the outlets $a^2$, $b^2$ for the waste gases are similarly connected together by means of a conduit $h$. The discharge of the waste gases from the outer end $a$ and the inner end $b$ of each cylinder is controlled respectively by valves $h'$, $h^2$, which are mounted in said conduit $h$ and have their spindles extending toward the shaft $f$. Concentric with this shaft and opposite the spindles of the valves is a cam $i$ which is fixed by means of the flange $i'$ to the casing $e$ of the engine. The cam consists of two grooves $i^2$, $i^3$, which are parallel for a portion of their lengths and then cross each other, as shown in Figs. 2 and 3. Fig. 4 shows one of the grooves in section and illustrates the contour of the cam. These grooves receive a tappet $j$ which is connected to the cylinder in any suitable manner, as, for example, by means of a link $j'$ attached by a ball-and-socket joint $j^2$ to an arm $j^3$ extending from the cylinder; a spring $j^4$ being provided to maintain the tappet in engagement with the cam. During the rotation of the cylinder in the direction of the arrow shown in Fig. 1, the tappet $j$ travels along the oblique portion of one of the grooves (say $i^2$) and across from the spindle of one of the valves (say $h'$) to the spindle of the other valve, when it enters the other groove ($i^3$), and opens the second valve ($h^2$) by reason of the larger or annular portion of the cam groove forcing the tappet $j$ outward against the valve spindle. In a similar manner, the tappet $j$ after operating the valve $h^2$ passes from the groove $i^3$ to the groove $i^2$ and operates the valve $h'$. These two valves are thus alternately opened during each second out stroke of the piston, so that at each second instroke first the outer or enlarged end $a^3$ of the piston expels the waste gases from the larger end $a$ of the cylinder, and then at the following instroke the inner or smaller end $b^3$ expels the waste gases from the smaller end $b$ of the cylinder. These gases enter the conduit $h$ whence they pass by way of an opening $h^3$, into a channel $e'$ formed in the casing $e$ and thence escape. The channel $e'$ is in the form of an arc corresponding to the angle through which the cylinder passes during the discharge of the waste gases, and in the example illustrated in Fig. 1 the angle is 240°, extending from $x$ to $y$. The channel $e'$ is closed by a ring $h^4$ which bears against a floating ring $h^5$ and in which ring are formed the outlets $h^3$ from the conduits $h$.

The admission of the combustible mixture into each cylinder is controlled by means similar to those above described for controlling the discharge of the waste gases. Each conduit $g$ is provided with valves $g'$, $g^2$, which respectively control the inlets $a'$, $b'$, and which are operated alternately by a tappet $j^6$ working in a cam $i^6$ similar to the cam $i$, the fuel inlet valves being operated in a similar manner to the eduction valves. The conduits $g$ communicate with a channel $e^2$ which is similar to the channel $e'$, but oppositely disposed and which receives the fuel from the source of supply and conveys it to the conduits of the several cylinders. The fuel may, however, be supplied to the conduit $g$ by way of the shaft $f$ which for this purpose would be made hollow. In the construction illustrated, the water for cooling the cylinders is conveyed through a tube $f^3$ in the axis of the shaft, whence it passes, by way of passages $f^4$, to a jacket formed between two disks $f^5$, $f^5$, inclosing the cylinders, and after circulating about the cylinders escapes by way of the annular passage $f^6$ formed around the tube $f^3$. In Fig. 2 the inlet and outlet for the water are shown on the fuel supply side of the cylinders, but it will be obvious that the tube $f^3$ may be on the opposite side for supplying the water, and that the fuel may be supplied through the axis of the shaft on the fuel side of the cylinder.

The sparking plugs $k$, $l$, are mounted in the exhaust conduits $a^2$, $b^2$, but they may, if desired, be mounted in the fuel conduits $a'$, $b'$ and respectively collect current from opposite sides of a fiber ring $k'$ mounted upon the case $e$ and each furnished with contact segments with which wipers $k^2$, $l^2$ make contact as the cylinders revolve.

For lubricating the engine the casing $e$ is supplied with oil into which the pistons dip when at the outer ends of their stroke, and the rollers $c$ throw the oil to the inner ends of the pistons where it exudes through perforations $m$ and lubricates the inner end of the cylinder. To retain a supply of oil within the smaller end $b$ of the piston a gutter $m^2$ is provided adjacent to the perforations.

In the working of the engine, each cylinder while revolving operates as follows:—
Referring to Fig. 1 and assuming a charge of fuel to be compressed in the enlarged end $a$ of the cylinder 1, ignition of this charge is effected and the expansion of the products of combustion takes place while the cylinder is traveling through an angle of 120°. During this period the piston in the cylinder moves the full length of its outward stroke and its smaller end draws a charge of fuel into the portion $b$ of the cylinder, the inlet valve $g^2$ of which has meanwhile been opened by its tappet $j^0$ and cam $i^0$. At the end of this period the outlet valve $h'$ is opened and the waste gases escape from the end $a$ while the cylinder is traveling through the next angle of 120°; the piston during this period remaining stationary in its cylinder. The cylinder having now traveled through an angle of 240° the fuel inlet valve $g^2$ of the portion $b$ is then closed but the outlet valve $h'$ of the portion $a$ is maintained open to permit the expulsion of the waste gases from the cylinder while traveling through the remainder of its revolution at the end of which the valve $h'$ is closed. During this third period of 120° the piston is forced inward and compresses the charge of fuel in the portion $b$ of the cylinder. At the second revolution of the engine the above cycle of operations is repeated but reversed in the opposite ends of the cylinder. That is to say, while expansion of the products of combustion is taking place in the smaller end $b$ of the cylinder fuel is being drawn into the larger end $a$ thereof, then while waste gases are escaping from the smaller end $b$ of the cylinder fuel is being admitted into the larger end $a$ thereof, and, finally, while the waste gases are being expelled from the smaller end $b$ of the cylinder the fresh charge of fuel is being compressed in the larger end $a$ thereof. It is not, however, essential that the piston should remain stationary in its cylinder for a period, as its inward travel may be commenced immediately after the end of its out stroke; and it will be obvious that this may be effected by commencing the reduction of the radius of the cam ring at 120° the piston then moving inward during two-thirds of a revolution of the engine and outward during one-third.

According to an alternative mode of construction the four strokes of the piston of each cylinder may be effected during one revolution instead of in two revolutions of the engine. This is accomplished by constructing the ring $d$ approximately elliptical in form, as shown diagrammatically in Fig. 5, while the valves are operated by cams of the construction shown in Figs. 6 and 7. Referring to Fig. 5, and assuming each cylinder to be rotating in the direction of the arrow, the working of the engine is as follows:—In the first quadrant expansion of the products of combustion takes place in the enlarged portion $a$ of the cylinder while fuel is admitted into the smaller end $b$. Second quadrant, discharge of the waste gases from portion $a$ and compression of fuel in portion $b$ of the cylinder. Third quadrant, admission of fuel into portion $a$ of the cylinder and expansion of products of combustion in portion $b$. Fourth quadrant, compression of fuel in portion $a$ of the cylinder and expulsion of waste gases from portion $b$ of the cylinder. To enable the eduction valves of the outer and inner ends of the cylinders to be opened alternately while the cylinder is traveling through the second and fourth quadrants, the tappet for these valves work in a cam groove of the form shown in Fig. 6 and comprising a channel $n$ in the plane of the outer eduction valve, and a channel $n'$ in the plane of the inner eduction valve. These two channels are in opposite quadrants and are of the contour shown in Fig. 7, while two channels $n^2$, $n^3$, connect the channels together so that the tappet may pass from the one to the other alternately.

What I claim as my invention and desire to secure by Letters Patent is:—

1. In an internal combustion rotary engine, the combination of a rotatably mounted shaft; a plurality of radiating cylinders affixed thereto, each cylinder having a pair of piston chambers of different diameters; a correspondingly shaped reciprocating piston operating in each of said cylinders and having a pair of working faces; inlet and exhaust ports for said piston chambers; ignition means; and an annularly shaped track having an uninterrupted tread surface movably engaged by said pistons, a portion of said track having a curvature gradually increasing in radius, a contiguous portion remaining unaltered at the maximum length of said increased radius, and the curvature of the remaining portion being gradually reduced in radius to meet the minimum radius.

2. In an internal combustion rotary engine, the combination of a rotatably mounted shaft; a plurality of radiating cylinders affixed thereto, each cylinder having a pair of piston chambers of different diameters; a correspondingly shaped piston operating in each of said cylinders and having a pair of working faces; ignition means; inlet and exhaust ports for said piston chambers; valves controlling said inlet and exhaust ports having spindles extending into proximity with said shaft; a pair of stationary annular cams mounted on said shaft adjacent said valve spindles, each provided on its annular peripheral surface with a pair of eccentric cam grooves, said cam grooves being annularly disposed and arranged parallel for a portion of their circumference, thence crossing each other to meet its complementary cam groove; spring controlled tappets having a universal joint connection with said cylinders and adapted to successively engage said cam grooves for alternately operating said inlet and exhaust valves during the cycle of rotation of said cylinders; and an annularly cam-shaped track having an uninterrupted tread surface movably engaged by said pistons.

3. In an internal combustion rotary engine, the combination of an annular casing; a shaft rotatably mounted in said casing; a plurality of radiating cylinders affixed to said shaft, each having a pair of piston chambers of different diameters; a correspondingly shaped reciprocating piston operating in each of said cylinders and having a pair of working faces; a cam-shaped track, having an uninterrupted tread surface encircling and movably engaged by said pistons; an arc-shaped channel formed on each side of said casing; an inlet conduit for each cylinder, communicating with said piston chambers, and having an opening registering with one of said arc-shaped channels; an exhaust conduit for each of said cylinders communicating with said piston chambers and having an opening registering with said other arc-shaped channel; ignition means; and automatically operated valves controlling said inlet and exhaust ports.

In witness whereof I have hereunto set my hand in the presence of two witnesses.

PERCY GEORGE TACCHI.

Witnesses:
    E. L. H. ELLIOTT,
    I. H. BOYLE.